(12) United States Patent
Smith et al.

(10) Patent No.: US 6,641,328 B1
(45) Date of Patent: Nov. 4, 2003

(54) FISH PROTECTIVE WATER EXTRACTION METHOD AND APPARATUS

(75) Inventors: Rodney Elliott Smith, Richmond (CA); Colin Victor Hall, Vancouver (CA)

(73) Assignee: Balaton Power Corporation S.A., Nassau (BS)

( * ) Notice: Subject to any disclaimer, the term of this patent is extended or adjusted under 35 U.S.C. 154(b) by 0 days.

(21) Appl. No.: 09/527,416

(22) Filed: Mar. 17, 2000

(Under 37 CFR 1.47)

Related U.S. Application Data

(60) Provisional application No. 60/124,986, filed on Mar. 18, 1999.

(51) Int. Cl.$^7$ ................................. E02B 3/00
(52) U.S. Cl. ........................... 405/80; 405/63; 405/52; 210/242.1; 210/121; 210/122
(58) Field of Search .................. 405/52, 60, 63, 405/80, 81, 83; 210/122, 128, 129, 242.1, 242.2, 540, 513, 121, 241

(56) References Cited

U.S. PATENT DOCUMENTS

| 3,757,953 A | * | 9/1973 | Sky-Eagle, Jr. | ........... 210/242.1 |
| 3,764,015 A | * | 10/1973 | Rolfson | .............. 210/242.1 |
| 3,860,518 A | * | 1/1975 | Henricksen | ........... 210/242.1 |
| 3,962,876 A | | 6/1976 | Phillips | ........................ 61/21 |
| 4,518,495 A | * | 5/1985 | Harding | ................. 210/242.1 |
| 4,891,128 A | | 1/1990 | Goronszy | ................. 210/121 |
| 4,973,405 A | * | 11/1990 | Kozey | ..................... 210/242.1 |
| 5,020,940 A | * | 6/1991 | Smith | ........................ 405/63 |
| 5,081,582 A | * | 1/1992 | Araki et al. | .................. 405/60 |
| 5,472,597 A | * | 12/1995 | Carro | ......................... 210/122 |
| 5,491,922 A | * | 2/1996 | Sanders | ........................ 405/63 |
| 5,820,751 A | | 10/1998 | Faircloth, Jr. | ................ 210/122 |
| 6,224,753 B1 | * | 5/2001 | Marbach | ..................... 210/122 |

OTHER PUBLICATIONS

PCT International Application No. PCT/US98/11488, filed Jun. 9, 1998, "Flow Inducer Fish Guide and Method of Using Same", Truebe, Jonathan Paul; Truebe, Eric Paul; International Publication No. WO 98/56241, International Publication Date Dec. 17, 1998 (with search report).

* cited by examiner

Primary Examiner—Thomas B. Will
Assistant Examiner—Alexandra K. Pechhold
(74) Attorney, Agent, or Firm—Kolisch Hartwell, P.C.

(57) ABSTRACT

An apparatus and method for extracting liquid from a body of liquid. The apparatus includes a conduit terminator operable to terminate a conduit, the conduit terminator having an inlet opening to facilitate conduction of liquid from the body of liquid. The apparatus includes a solid object diverter connected to the conduit terminator, the diverter defining a liquid admitting cavity about the inlet opening to impede solid objects from entering the inlet opening while permitting entry of liquid into the cavity for admission into the inlet opening. The apparatus also has a positioner operable to position the diverter in a position in the liquid body such that the cavity admits liquid from the body of liquid while the inlet opening admits liquid from the cavity.

26 Claims, 5 Drawing Sheets

FISH PROTECTIVE WATER EXTRACTION METHOD AND APPARATUS

CROSS-REFERENCE TO RELATED APPLICATIONS

This application claims the benefit of U.S. Provisional Patent Application Ser. No. 60/124,986, filed Mar. 18, 1999.

FIELD OF THE INVENTION

The present invention relates to liquid extraction, and more particularly to a method and apparatus for extracting liquid from a body of liquid.

BACKGROUND OF THE INVENTION

Many industrial, commercial and agricultural applications require the extraction of water from bodies of water such as streams, rivers, lakes and oceans, for example. However, conventional water extraction devices suffer from a number of disadvantages.

In order to supply sufficient volumes of water for many applications, the diameter of an intake hose or other conduit inserted into the water must be sufficiently large that fish and other macroscopic objects may be sucked into the hose. This may cause blockages of the intake conduit or cause other difficulties for the application at hand. Moreover, conventional water extraction devices of this nature have proven to be highly destructive to fish stocks. Accordingly, the United States has enacted legislation requiring industries and other water users to provide fish-protective devices on water intake inlets, and other jurisdictions are also expected to enact such legislation.

One previous fish-protective water extraction device involves attaching a hose to a life preserver, such that an inlet opening of the hose is located beneath the water level. The inlet opening of the hose is covered with a mesh, to prevent the entry of fish or other objects. However, it has been found that such a mesh typically clogs with debris very quickly, requiring frequent intervention to unclog the mesh.

Other extraction devices involve positioning an inlet near the bottom of a body of water, where fewer fish may be found in some cases. However, this approach results in extraction of a considerable amount of silt and other sediment in the water, which may render the water unsuitable for many purposes. For example, such silt and sediment may unduly pollute water required for irrigation, or may cause increased wear on turbine components in hydroelectric stations due to "sand-blasting" by the silt.

Accordingly, there is a need for an improved water extraction method that reduces the likelihood of harming fish, without unduly compromising the quality of water.

SUMMARY OF THE INVENTION

The present invention addresses the above need by providing a method and apparatus for extracting liquid from a body of liquid. The apparatus includes a conduit terminator operable to terminate a conduit, the conduit terminator having an inlet opening to facilitate conduction of liquid from the body of liquid. The apparatus also has a solid object diverter connected to the conduit terminator, the diverter defining a liquid admitting cavity about the inlet opening to impede solid objects from entering the inlet opening while permitting entry of liquid into the cavity for admission into the inlet opening. The apparatus further includes a positioner operable to position the diverter in a position in the liquid body such that the cavity admits liquid from the body of liquid while the inlet opening admits liquid from the cavity.

Thus, the solid object diverter serves to prevent or impede the entry of fish and other solid objects into the inlet opening of the conduit terminator.

Preferably, the positioner includes floats on opposite sides of the diverter, in which case the apparatus extracts liquid from near the surface of the body of liquid, thereby greatly reducing the amount of silt and other sediment admitted into the inlet opening of the conduit terminator.

The apparatus preferably includes a housing for producing a passageway for directing liquid past the solid object diverter, in which case the diverter may be in the housing and the floats may cooperate with the housing. The housing preferably has a wall defining a cavity opening for admitting liquid into the liquid admitting cavity, and further defines a gas vent for permitting gas flow into and out of the liquid admitting cavity.

The apparatus may further include a turbulence producing mechanism operable to produce a turbulent flow of liquid from the housing. It has been found that fish are attracted to turbulence, and accordingly, the turbulence produced by the mechanism tends to attract fish toward an outlet end of the housing rather than toward an inlet end, thus reducing the likelihood that fish will pass through the housing.

Preferably, the turbulence producing mechanism includes a venturi accelerator in or formed by the housing, which serves to produce a high-speed flow as the liquid exits the venturi accelerator, resulting in turbulence behind the outlet end region of the housing. In this regard, the housing may include spaced apart converging walls for forming the venturi accelerator.

Advantageously, the converging walls may be adjustably spaced apart to permit adjustment of the spacing between the converging walls. The converging walls preferably include first and second resilient channel members rigidly attached to respective opposite sides of the housing at an inlet end region of the housing, in which case the apparatus further includes first and second adjustable channel spacers at an outlet end region of the housing, operable to resiliently deform the channel members to adjustably inwardly space the channel members from the sides at the outlet end region, to adjustably define the venturi accelerator. Effectively, this permits the intensity of the venturi effect to be adjusted to account for the needs of different locations or different conditions at the same location, or different applications. For example, to compensate for slower water currents, it is generally desirable to bring the converging walls closer together, to increase the intensity of the venturi effect.

In addition, or alternatively, the turbulence producing mechanism may include at least one blocking member disposed in an outlet end region of the housing.

The housing preferably has a floating object deflector. This serves to deflect floating objects away from the housing, without passing through it.

The solid object diverter preferably has a hydrodynamic shape, such as a teardrop shape, for example.

The apparatus may further include a data acquisition unit for acquiring environmental data.

The floats preferably have hydrodynamic shapes. The floats may include first and second outer fins extending outwardly from opposite sides of an inlet end region of the housing, and extending rearwardly toward an outlet end region of the housing, substantially parallel with the sides. Respective fin spacers extend outwardly from the sides and engage with the respective fins to space the fins from the sides. The floats may then include a buoyant medium in a space defined between the fins and the sides of the housing. It has been found that such a float improves the hydrodynamic shape of the apparatus.

At least one of the floats may include a watertight control housing for containing a control unit within the float.

The apparatus preferably includes a tether connector for tethering the apparatus to an object. For example, an inlet end region of the housing may be connected to a tether which in turn is connected to a fixed object at the bottom of the body of liquid, to ensure that the inlet end region of the housing remains upstream from an outlet end region of the housing.

In accordance with another aspect of the invention, there is provided a method of extracting liquid from a body of liquid. The method involves positioning a solid object diverter in the liquid body to admit liquid into a cavity of the solid object diverter while admitting liquid from the cavity into an inlet opening of a conduit terminator about which the solid object diverter extends.

In accordance with another aspect of the invention, there is provided a method of guiding fish, involving disposing a plurality of water turbulence generators in a body of water at a plurality of respective positions along a desired fish path.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
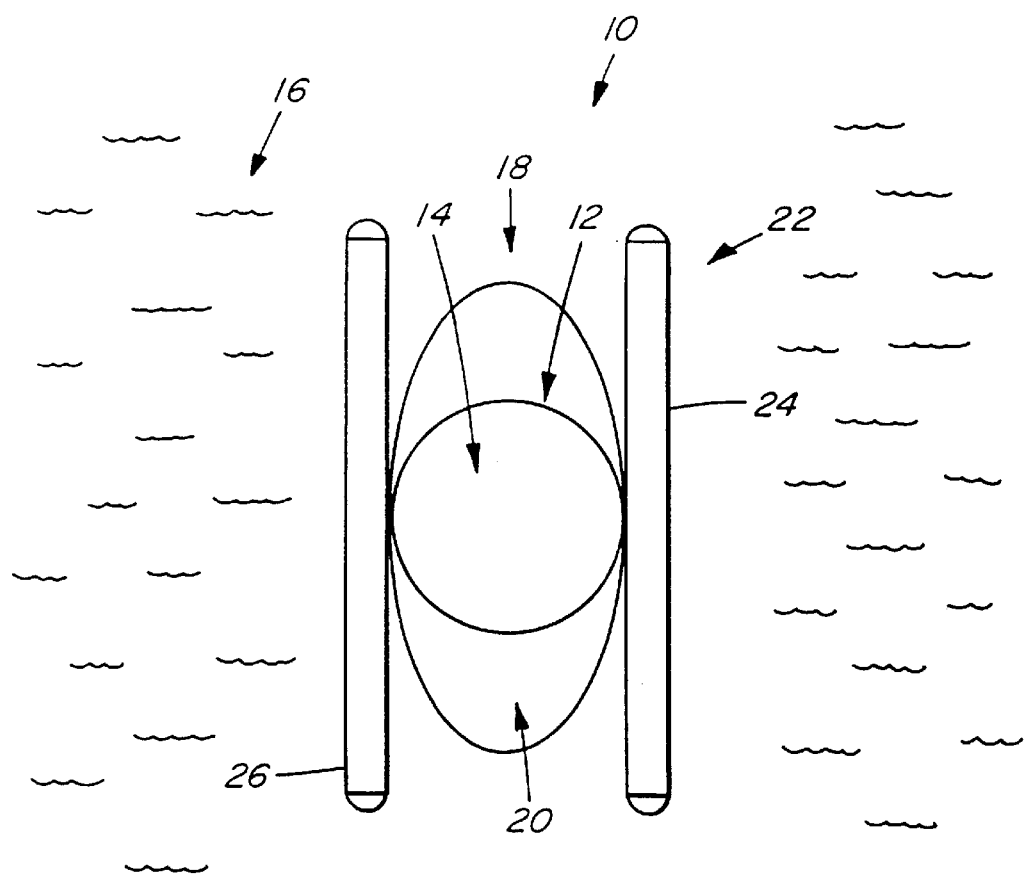
FIG. 1 is a schematic representation of an apparatus for extracting liquid from a body of liquid, according to a first embodiment of the invention.

Referring to FIG. 1, an apparatus for extracting liquid from a body of liquid according to a first embodiment of the invention is shown schematically at 10. The apparatus includes a conduit terminator 12 operable to terminate a conduit, the conduit terminator having an inlet opening 14 to facilitate conduction of liquid from a body of liquid shown generally at 16. The apparatus further includes a solid object diverter 18 connected to the conduit terminator 12, the diverter 18 defining a liquid admitting cavity 20 about the inlet opening 14 to impede solid objects from entering the inlet opening 14 while permitting entry of liquid into the cavity 20 for admission into the inlet opening. The apparatus also has a positioner shown generally at 22, operable to position the diverter 18 in a position in the liquid body 16 such that the cavity 20 admits liquid from the body of liquid 16 while the inlet opening 14 admits liquid from the cavity 20.

Housing

Figure 2:
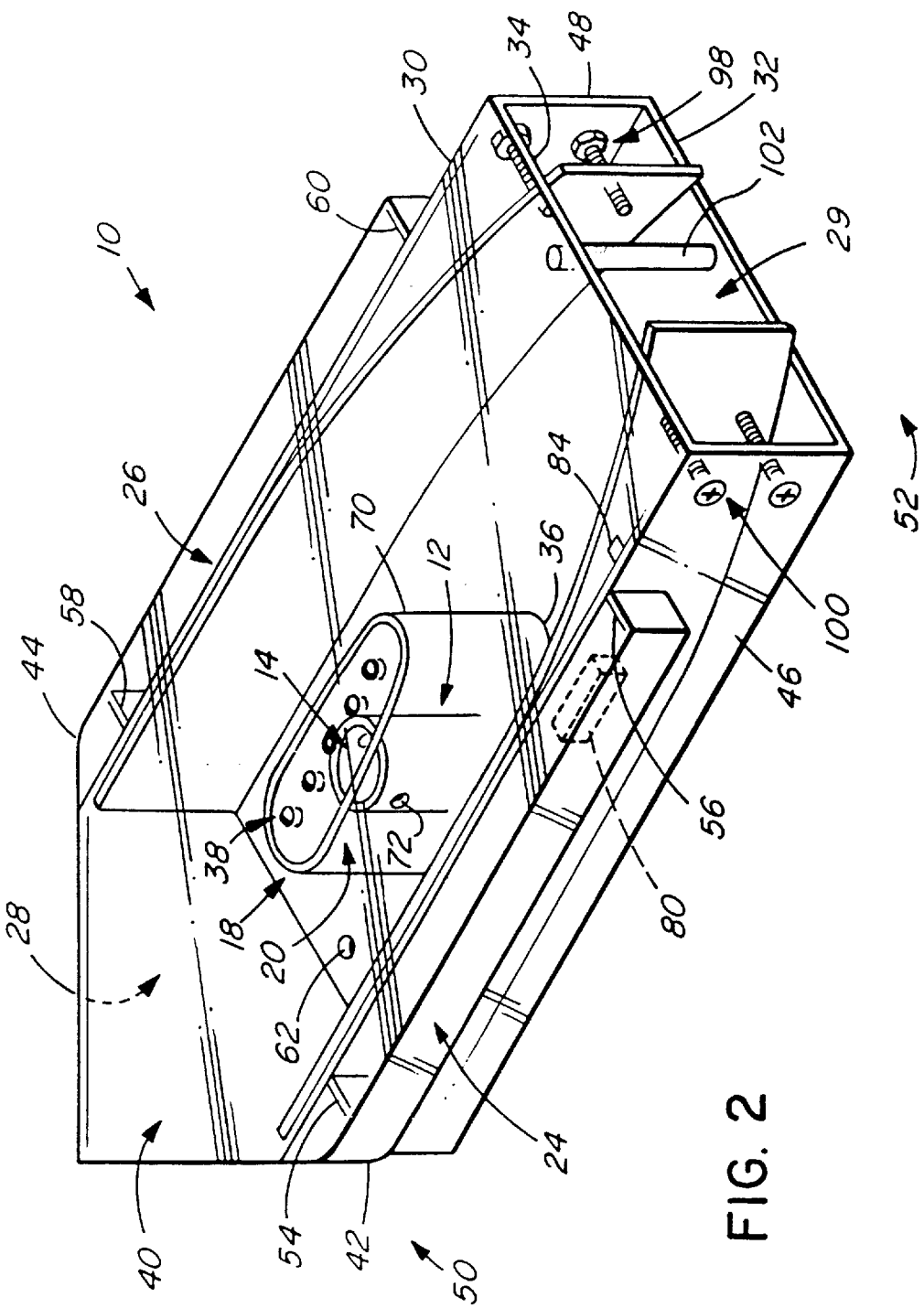
FIG. 2 is a perspective view of an apparatus for extracting liquid from a body of liquid, according to a second embodiment of the invention.

Referring to FIG. 2, an apparatus for extracting liquid from a body of liquid according to a second embodiment of the invention is shown generally at 10.

In this embodiment, the apparatus includes a housing 30 for providing a passageway for directing liquid past the solid object diverter 18. The passageway is defined between a housing passageway inlet 28 defined by the housing 30 at an inlet end region 50 of the housing, and a housing passage outlet 29 defined by the housing 30 at an outlet end region 52 of the housing. In this embodiment, the diverter 18 is in the housing 30. Preferably, the breadth of the housing passageway inlet 28 is approximately three times the breadth of the diverter 18.

Figure 3:
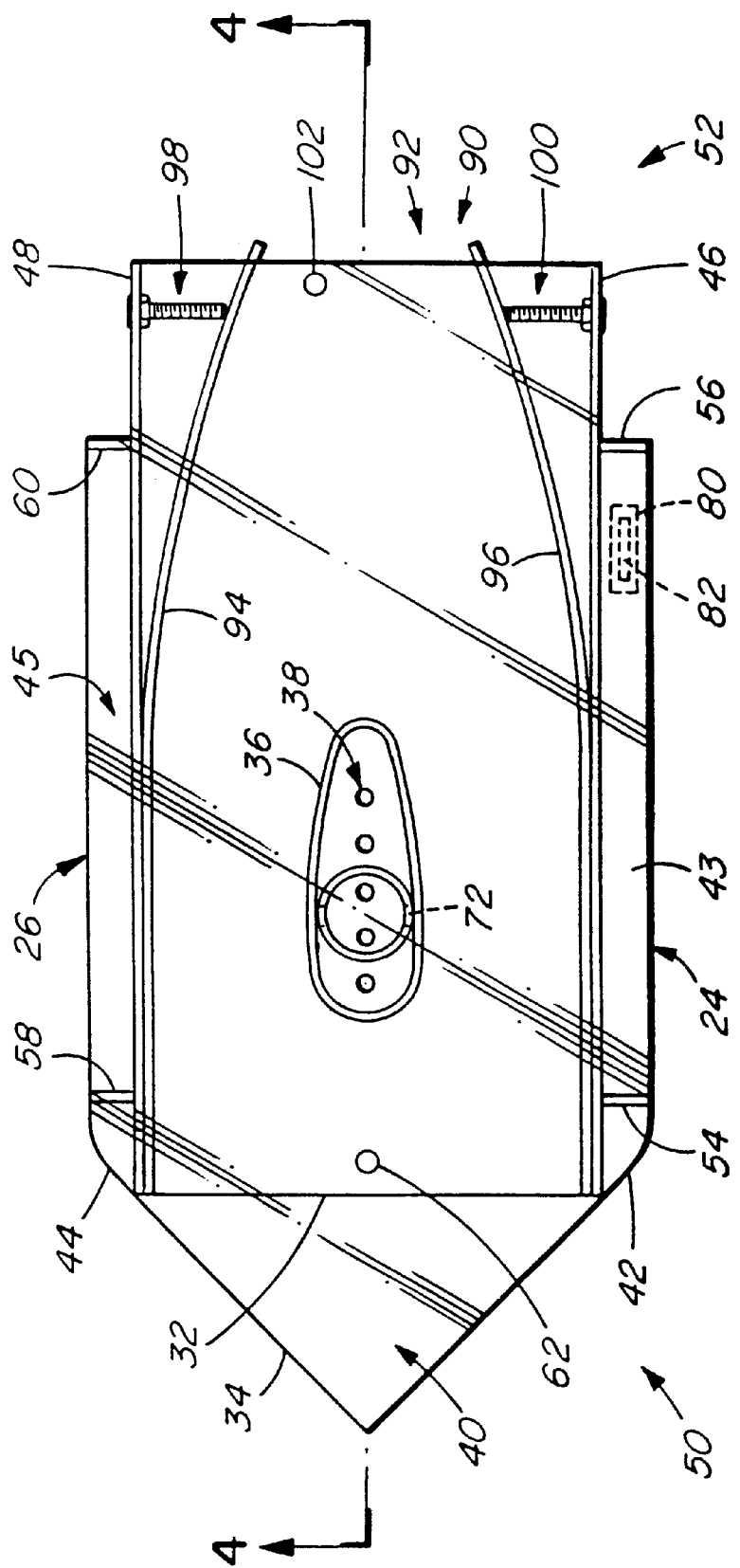
FIG. 3 is a top plan view of the apparatus shown in FIG. 2.

Referring to FIGS. 2 and 3, the housing 30 has a wall, which in this embodiment is a base portion 32 of the housing 30, defining a cavity opening 36 for admitting liquid into the liquid admitting cavity 20. In this embodiment, the cavity opening 36 is shaped and sized similarly to a cross-section of the diverter 18 that defines the cavity 20, although it will be appreciated that the shapes and sizes of the cavity opening 36 and the cavity 20 need not be the same.

In this embodiment, the housing 30 further defines a gas vent 38 therein, for permitting gas flow into and out of the liquid admitting cavity. The gas vent 38 includes a plurality of apertures formed through a cover portion 34 of the housing 30. However, a single aperture, or other types of gas vents, such as one or more pipes extending upwardly from the cover portion 34 for example, may be substituted for the plurality of apertures.

Preferably, the base portion 32 and the cover portion 34 of the housing 30 are separated by a distance ranging from two to three times the breadth of the diverter 18.

The housing 30 further includes a floating object deflector shown generally at 40. In this embodiment, the floating object deflector 40 is formed by the cover portion 34 of the housing 30, which terminates in a V-shaped portion pointing away from the diverter 18 and extending distally further from the diverter than the base portion 32. The deflector 40 serves to redirect floating debris away from the housing 30, thus preventing such floating debris from becoming stuck within the housing.

The housing 30 further includes a tether connector 62 for tethering the apparatus to an object. In this embodiment, the tether connector 62 is located on the base portion 32 of the housing 30, near the inlet end region 50 of the housing. When a tether is connected at one end to the tether connector 62 and at another end to a fixed object such as a concrete block at the bottom of a river bed for example, the tether will serve to pull the inlet end region 50 in a direction opposite to the current flow in the river, so as to orient the housing 30 with the inlet end region 50 upstream of the outlet end region 52. Alternatively, it will be appreciated that a plurality of tether connectors may be substituted, and that the location on the housing of the tether connector or plurality of such connectors may be varied. For example, a two-, three- or four-point tether connector may be appropriate depending on site conditions.

Diverter and Conduit Terminator

Referring to FIGS. 2 and 3, in this embodiment the solid object diverter 18 includes a vertical wall 70 extending between the base portion 32 and the cover portion 34 of the housing 30. In this embodiment, the vertical wall 70 extends in a closed loop, to define the liquid admitting cavity 20 therein. The diverter 18 preferably has a hydrodynamic shape, which in this embodiment is a teardrop shape formed by the closed loop vertical wall 70.

In this embodiment, the solid object diverter 18 is connected to the conduit terminator 12 by a connector shown generally at 72, which in this embodiment includes first and second opposed rivets, each rivet extending through the diverter 18 and conduit terminator 12 at respective opposite sides. Preferably, the diverter 18 is loosely riveted to the conduit terminator 12 to permit pivoting of the conduit terminator within the diverter, the range of the pivotal motion being limited by an inner surface of the vertical wall 70 of the diverter. Alternatively, other means of connecting the diverter to the conduit terminator may be substituted.

The connector 72 is positioned relative to the diverter 18 and the conduit terminator 12 so as to ensure that the inlet opening 14 of the conduit terminator remains below the water level in the cavity 20 during normal operation.

If desired, the conduit terminator 12 may include a plurality of small apertures (not shown) either within the cavity 20 or extending beneath the housing 30 or both, which serve to decrease the rate at which water is drawn into the inlet opening 14.

Positioner

Referring to FIG. 3, in this embodiment the positioner 22 includes first and second floats 24 and 26 cooperating with the housing 30, on opposite sides of the diverter 18. The floats 24 and 26 preferably have hydrodynamic shapes. More particularly, in this embodiment the floats 24 and 26 include first and second fins 42 and 44 extending outwardly from opposite sides 46 and 48 of the housing 30 at the inlet end region 50, and extending rearwardly toward the outlet end region 52 of the housing, substantially parallel with the sides 46 and 48. The housing further includes respective fin spacers 54, 56, 58 and 60 extending outwardly from the sides 46 and 48 and engaging with the respective fins 42 and 44 to space the fins from the sides. It will be appreciated that other numbers of fins and/or spacers may be substituted, the fins serving to improve the hydrodynamic shape of the housing 30. Alternatively, however, other types of floats may be substituted.

Each of the floats 24 and 26 includes a buoyant medium, such as styrofoam shown at 43 and 45 for example, in a space defined between the fins 42, 44 and the sides 46, 48 of the housing 30 respectively. Alternatively, other buoyant media or objects may be substituted.

In this embodiment, the float 24 includes a watertight control housing 80 for containing a control unit 82 within the float. If desired, float cover and base portions (not shown) may be provided and sealed to the fin and the housing so that the entire interior of the float containing the control unit is watertight. Alternatively, a smaller watertight housing may be provided within the buoyant medium.

If desired, each of the floats may be provided with a water ballast in a lower portion of the float, to provide a variable buoyancy of the apparatus 10. The water ballast may be controlled automatically by the control unit 82, for example.

Turbulence Producing Mechanism

Fish are generally attracted to turbulence, and thus the production of such turbulence may be desirable, in order to guide their motion or swimming paths.

Referring to FIG. 3, to achieve this, the apparatus 10 preferably includes a turbulence producing mechanism shown generally at 90, operable to produce a turbulent flow of liquid from the housing. More particularly, in this embodiment the turbulence producing mechanism 90 includes a venturi accelerator 92 in, or formed by, the housing.

In the present embodiment, the housing 30 includes spaced apart converging walls 94 and 96 for forming the venturi accelerator. Preferably, the distance between the converging walls 94 and 96 at the outlet end region 52 is approximately one-third the distance between the converging walls at the inlet end region 50.

The converging walls 94 and 96 are preferably adjustably spaced apart to permit adjustment of the spacing between the converging walls. To achieve such adjustable spacing, in this embodiment the converging walls 94 and 96 include first and second resilient channel members respectively. The resilient channel members are rigidly attached to respective opposite sides 48 and 46 of the housing 30 at the inlet end region 50 of the housing 30. The apparatus 10 further includes first and second adjustable channel spacers 98 and 100 at the outlet end region 52 of the housing 30, operable to resiliently deform the channel members to adjustably inwardly space the channel members from the sides at the outlet end region, to adjustably define the venturi accelerator. In this embodiment each of the channel spacers 98 and 100 includes a pair of screws cooperating with corresponding threads in the sides 48 and 46 of the housing, such that clockwise rotation of the screws forces the screws further into the interior of the housing, thereby resiliently inwardly deforming the channel members. Alternatively, other types of adjustable channel spacers may be substituted.

Still referring to FIG. 3, alternatively, or in addition, the turbulence producing mechanism 90 may include one or more blocking members 102 disposed in the outlet end region 52 of the housing. For example, such a blocking member may include one or more small diameter pipes inserted into the base portion 32 of the housing 30, pointed obliquely downstream. As a further example, one or both of the converging walls 94 and 96 may be provided with a baffle (not shown) to produce the desired turbulence. Other turbulence producing mechanisms will be apparent to one of ordinary skill in the art upon reading this specification, and are not considered to depart from the scope of the invention.

Control Unit

Referring to FIGS. 2 and 3, the control unit 82 contained within the watertight control housing 80 of the float 24 acts as a data acquisition unit for acquiring environmental data. To achieve this, the control unit 82 is in communication with a plurality of sensors such as a temperature sensor shown at 84 in FIG. 2. Such sensors may be located at various locations either on or interior to the housing, or alternatively may be located remotely from the apparatus 10, in wired or wireless communication with the control unit 82.

More generally, the apparatus 10 may be configured to act as an environmental data buoy, for detecting such properties as temperature, turbidity, depth and atmospheric pressure, for example. Existing sensors to detect these properties and control software to remotely transmit such measured data are well known and need not be described in greater detail. Preferably, however, the control unit 82 and plurality of sensors are configured to act as a satellite-accessible environmental monitoring system similar to that employed in Montana, U.S.A. by the Bureau of Reclamation.

In addition to monitoring environmental data, the control unit 82 may also be configured to monitor performance parameters, such as inefficient operation suggesting debris or blockage, for example.

In this embodiment, the control unit 82 also provides various control functions. For example, if the floats 24 and 26 shown in FIG. 3 employ water ballasts, the control unit may be configured to automatically control filling and draining of the ballasts in response to changing environmental conditions, as detected by the plurality of sensors. To achieve this, the control unit may produce signals to actuate a plurality of valves or pumps (not shown) on the floats, for example.

In addition, numerous other features of the apparatus 10 may be automatically controlled by the control unit 82. For example, each of the adjustable channel spacers 98 and 100 may include an electric motor in communication with the control unit, for automatically decreasing the spacing between the channel members in response to decreasing current.

In addition, if desired, a valve (not shown) such as a butterfly valve may be provided within the conduit terminator 12, to regulate the flow of liquid into the inlet opening 14, and could be automatically controlled in response to changing parameters.

As a further example, one or more propellers or fins (not shown) may be provided to permit the control unit 82 to cause the apparatus 19 to swivel within the water, in order to dislodge debris which may have become stuck in the apparatus.

Also, rather than using the tether connector 62 to merely connect a fixed length tether to a fixed object, it may be desirable to automatically vary the length of the tether to compensate for changing water levels, or more particularly, to decrease the length of the tether as the water level drops and increase its length as the water level rises. To achieve this, the control unit 82 may be configured to control a hydraulic or other adjustable unit, to automatically retract or extend the tether in response to changing conditions.

In addition to automatically controlling the above functions, the control unit 82 may include a transceiver for satellite communications, to enable the control unit to receive control commands for a remote location, and to enable the control unit to transmit environmental and performance data to the remote location.

Suitable control codes for directing the control unit 82 to perform the above functionality may be obtained from REM Technology Inc. of Coquitlam, British Columiba, Canada, a division of Spartan Controls Ltd. of Calgary, Alberta, Canada.

The control unit 82 may be powered by battery systems mounted in the floats, or alternatively, by water-driven turbines mounted along-side or within the housing 30, and connected to on-board power generating systems or battery charging devices.

Operation

Referring to FIGS. 2 and 3, in operation, the solid object diverter 18 is positioned in the liquid body to admit liquid into the cavity 20 of the solid object diverter 18, while admitting liquid from the cavity into the inlet opening 14 of the conduit terminator 12 about which the solid object diverter 18 extends.

As an illustrative example, the apparatus 10 may be positioned in a river, by virtue of the floats 24 and 26 which keep the apparatus afloat, and by virtue of a tether connected at one end to the tether connector 62 on the base portion 32 at the inlet end region 50 of the housing 30, and connected at the opposite end to a concrete block submerged at the river bed, for example. The combined effect of the current and the tether attached to the inlet end region 50 will be to maintain the inlet end region 50 of the housing upstream from the outlet end region 52.

The buoyancy of the floats 24 and 26 is selected such that the apparatus 10 will be almost entirely submerged in normal operation. Ideally, the floating object deflector 40 will be substantially coplanar with the surface level of the water, to effectively floating objects away from the apparatus 10. In this substantially submerged orientation, the gas vent 38 will permit any air trapped within the cavity 20 to exit the cavity, thereby effectively admitting liquid into the cavity through the cavity opening 36, until the water level within the cavity is above the inlet opening 14 of the conduit terminator 12.

Figure 4:
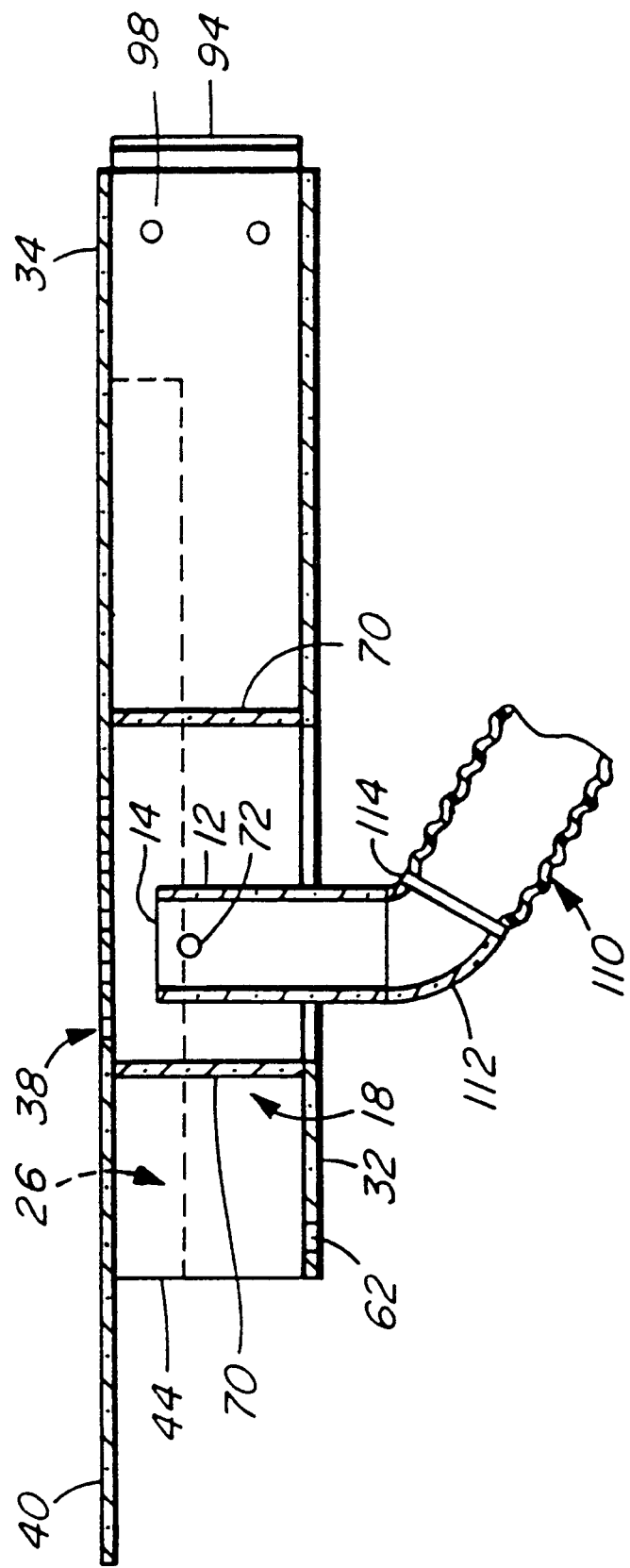
FIG. 4 is a cross-section along line 4—4 shown in FIG. 3.

Referring to FIG. 4, the conduit terminator 12 may be connected to a conduit 110. In this embodiment the conduit terminator is fitted with a joint 112, and a first end of the conduit 110 is secured to the joint 112 with an O-ring clamp 114. Alternatively, other means of connecting the conduit to the conduit terminator may be substituted. At least part of the conduit is preferably flexible, to accommodate changes in water levels.

A second end (not shown) of the conduit 110 may then be exposed to a lower pressure than the water pressure at the inlet opening 14 of the conduit terminator 12, to cause water to be admitted from the cavity 20 into the inlet opening 14 of the conduit terminator 12, and to flow through the conduit to the second end. The lower pressure at the second end may be generated artificially, if desired, for irrigation or industrial use, for example.

Alternatively, the lower pressure may be generated naturally. For example, dams for hydroelectric power stations often result in less water flow at the surface of a body of water, which causes increased solar heating near the surface. It has been found that such warmer temperatures tend to disorient many fish, rendering them more vulnerable to predators. To partially compensate for this effect, a plurality of apparatuses such as the apparatus 10 may be disposed and tethered in proximity to a dam, and the second ends of the respective conduits 110 may be permitted to dangle freely near the bottom of the body of water. Water currents in the vicinity of the second ends will be greater than those in the vicinity of the inlet openings 14 which are protected by the diverters 18, and thus, the water currents will generate a lower pressure at the second ends, causing warmer surface water to be drawn into the inlet openings 14 and conducted through the conduits to the bottom of the body of water. The warmer water drawn from the surface will then be displaced by cooler water rising up from below.

In addition, a plurality of apparatuses 10 may be used to guide fish along a desired fish path. According to the Katzmayer effect, fish often look for the fastest current and face into it, thus travelling backwards downstream. Accordingly, if it is desired to channel fish along a particular path, for example, to channel the fish toward a dam by-pass, a plurality of water turbulence generators such as the apparatus 10 may be disposed in the body of water at a plurality of respective positions along the desired fish path. For example, a plurality of apparatuses 10 may be arranged in a diagonal row across a river, to effectively channel the fish in the direction of the diagonal row.

Alternatives

If desired, the effectiveness of the apparatus 10 in impeding fish and other objects from entering the inlet opening 14 may be further improved. For example, if desired, a second solid object diverter, such as a V-shaped plow for example, may extend downwardly from the base portion 32 of the housing 30, immediately adjacent the cavity opening 36 of the housing 30, the "V" pointing in an upstream direction toward the inlet end portion 50. Alternatively, a mesh or screen may be placed across the cavity opening 36, although this may pose additional mesh blockage problems.

The apparatus 10 may further include navigation lights (not shown). Such lights may be powered by suitable turbines for example, or alternatively by batteries or other sources (not shown).

Figure 5:
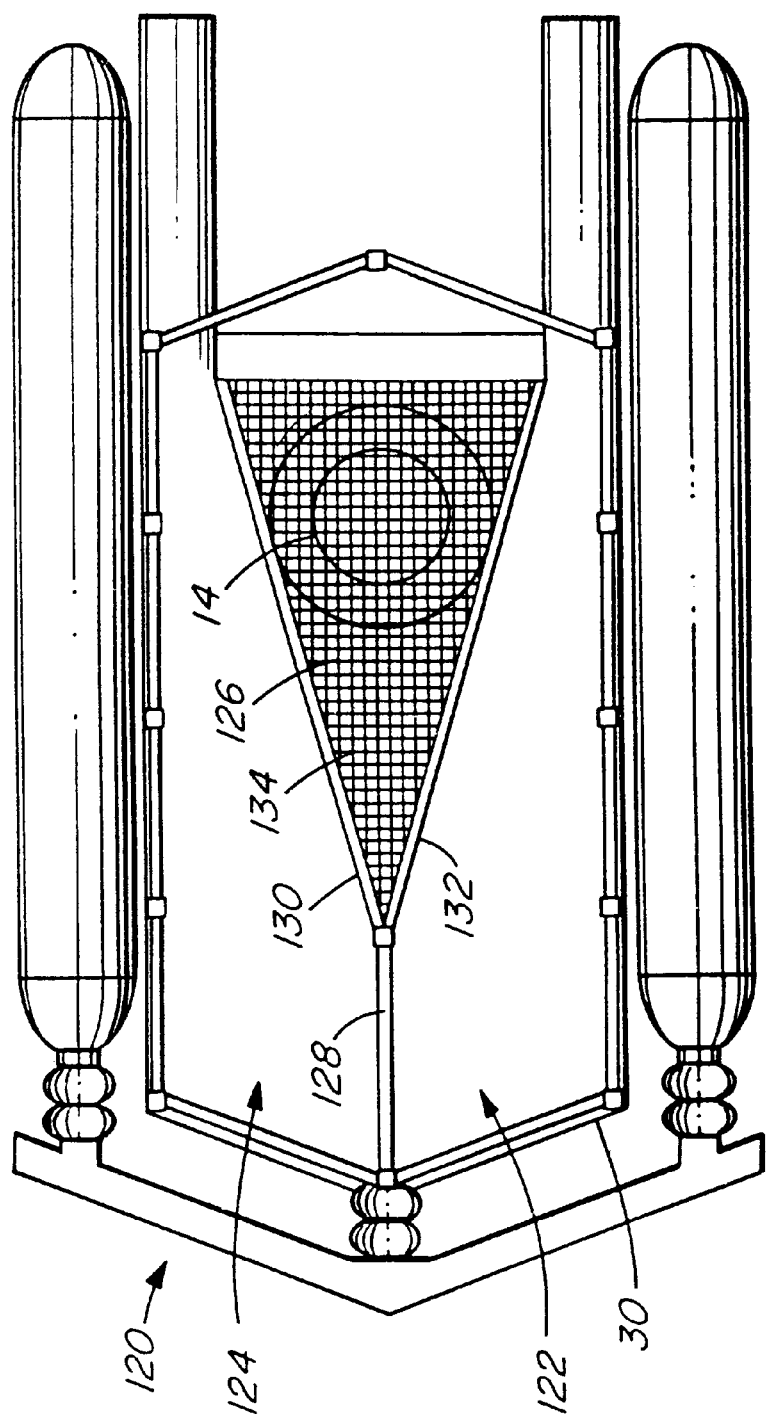
FIG. 5 is a top view of an apparatus for extracting liquid from a body of liquid, according to a third embodiment of the invention.

In addition, referring to FIG. 5, although a single venturi accelerator apparatus 10 has been described, the apparatus 10 could be modified to provide two or more venturi accelerators. As shown in FIG. 5, an apparatus for extracting liquid from a body of liquid according to a third embodiment of the invention is shown generally at 120. In this embodiment, the solid object diverter includes a kevlar net 126 surrounding the inlet opening 14 of the conduit terminators 12, and further includes inner separator walls 128, 130 and 132 which cooperate with the housing 30 to define first and second venturi accelerators 122 and 124. The inlet opening 14 of the conduit terminator 12 is located in a back eddy pool 134, sheltered downstream behind the venturi accelerators and the kevlar net.

While specific embodiments of the invention have been described and illustrated, such embodiments should be considered illustrative of the invention only and not as limiting the invention as construed in accordance with the accompanying drawings.

What is claimed is:

1. An apparatus for extracting liquid from a body of liquid, the apparatus comprising:
    a) a conduit terminator operable to terminate a conduit, said conduit terminator having an inlet opening to facilitate conduction of liquid from said body of liquid;
    b) a solid object diverter comprising at least one solid wall surrounding said inlet opening to define a liquid admitting cavity about said inlet opening to impede solid objects from entering said inlet opening while permitting entry of liquid into said cavity for admission into said inlet opening;
    c) a positioner operable to position said diverter in a position in said liquid body such that said cavity admits liquid from said body of liquid while said inlet opening admits liquid from said cavity;
    d) a housing for providing a passageway for directing liquid past the solid object diverter; and
    e) a turbulence producing mechanism operable to produce a turbulent flow of liquid from said housing, wherein said turbulence producing mechanism comprises a venturi accelerator in said housing.

2. A method of guiding fish, the method comprising disposing a plurality of apparatuses as defined by claim 1 in a body of water at a plurality of respective positions along a desired fish path.

3. An apparatus as claimed in claim 1 wherein the solid object diverter is in the housing.

4. An apparatus as claimed in claim 3 wherein said housing has a wall defining a cavity opening for admitting liquid into said liquid admitting cavity.

5. An apparatus as claimed in claim 4 wherein said housing further defines a gas vent for permitting gas flow into and out of said liquid admitting cavity.

6. An apparatus as claimed in claim 4 wherein said positioner comprises floats on opposite sides of the diverter.

7. An apparatus as claimed in claim 1 wherein said turbulence producing mechanism comprises at least one blocking member disposed in an outlet end region of said housing.

8. An apparatus as claimed in claim 1 wherein said positioner comprises floats cooperating with the housing.

9. An apparatus as claimed in claim 8 wherein said floats have hydrodynamic shapes.

10. An apparatus as claimed in claim 9 wherein said floats comprise:
    a) first and second outer fins extending outwardly from opposite sides of said housing at an inlet end region thereof, and extending rearwardly toward an outlet end region of said housing, substantially parallel with said sides; and
    b) respective fin spacers extending outwardly from said sides and engaging with said respective fins to space said fins from said sides.

11. An apparatus as claimed in claim 10 wherein said floats further comprise a buoyant medium in a space defined between said fins and said side of said housing.

12. An apparatus as claimed in claim 11 wherein at least one of said floats comprises a watertight control housing for containing a control unit within said at least one of said floats.

13. An apparatus as claimed in claim 1 wherein said housing has a floating object deflector.

14. An apparatus as claimed in claim 1 wherein said diverter has a hydrodynamic shape.

15. An apparatus as claimed in claim 14 wherein said hydrodynamic shape comprises a teardrop shape.

16. An apparatus as claimed in claim 1 further comprising a data acquisition unit for acquiring environmental data.

17. An apparatus as claimed in claim 1 further comprising a tether connector for tethering said apparatus to an object.

18. An apparatus for extracting liquid from a body of liquid, the apparatus comprising:
    a) a conduit terminator operable to terminate a conduit, said conduit terminator having an inlet opening to facilitate conduction of liquid from said body of liquid;
    b) a solid object diverter comprising at least one solid wall surrounding said inlet opening to define a liquid admitting cavity about said inlet opening to impede solid objects from entering said inlet opening while permitting entry of liquid into said cavity for admission into said inlet opening;
    c) a positioner operable to position said diverter in a position in said liquid body such that said cavity admits liquid from said body of liquid while said inlet opening admits liquid from said cavity;
    d) a housing for providing a passageway for directing liquid past the solid object diverter; and
    e) a turbulence producing mechanism operable to produce a turbulent flow of liquid from said housing, wherein said turbulence producing mechanism comprises a venturi accelerator formed by said housing.

19. An apparatus as claimed in claim 18 wherein said housing comprises spaced apart converging walls for forming said venturi accelerator.

20. An apparatus as claimed in claim 19 wherein said converging walls are adjustably spaced apart to permit adjustment of the spacing between said converging walls.

21. An apparatus as claimed in claim 20 wherein:
    a) said converging walls comprise first and second resilient channel members rigidly attached to respective opposite sides of said housing at an inlet end region of said housing; and
    b) said apparatus further comprises first and second adjustable channel spacers at an outlet end region of said housing, operable to resiliently deform said channel members to adjustably inwardly space said channel members from said sides at said outlet end regions, to adjustably define said venturi accelerator.

22. An apparatus for extracting liquid from a body of liquid, the apparatus comprising:
    a) a conduit terminator operable to terminate a conduit, said conduit terminator having an inlet opening to facilitate conduction of liquid from said body of liquid;
    b) a solid object diverter connected to said conduit terminator, said diverter defining a liquid admitting cavity about said inlet opening to impede solid objects from entering said inlet opening while permitting entry of liquid into said cavity for admission into said inlet opening;

c) a positioner operable to position said diverter in a position in said liquid body such that said cavity admits liquid from said body of liquid while said inlet opening admits liquid from said cavity;

d) a housing for providing a passageway for directing liquid past the solid object diverter; and e) a turbulence producing mechanism operable to produce a turbulent flow of liquid from said housing, wherein said turbulence producing mechanism comprises a venturi accelerator in said housing.

23. An apparatus for extracting liquid from a body of liquid, the apparatus comprising:

a) a conduit terminator operable to terminate a conduit, said conduit terminator having an inlet opening to facilitate conduction of liquid from said body of liquid;

b) a solid object diverter connected to said conduit terminator, said diverter defining a liquid admitting cavity about said inlet opening to impede solid objects from entering said inlet opening while permitting entry of liquid into said cavity for admission into said inlet opening;

c) a positioner operable to position said diverter in a position in said liquid body such that said cavity admits liquid from said body of liquid while said inlet opening admits liquid from said cavity;

d) a housing for providing a passageway for directing liquid past the solid object diverter; and e) a turbulence producing mechanism operable to produce a turbulent flow of liquid from said housing, wherein said turbulence producing mechanism comprises a venturi accelerator in said housing.

24. An apparatus as claimed in claim 23 wherein said housing comprises spaced apart converging walls for forming said venturi accelerator.

25. An apparatus as claimed in claim 24 wherein said converging walls are adjustably spaced apart to permit adjustment of the spacing between said converging walls.

26. An apparatus as claimed in claim 25 wherein:

a) said converging walls comprise first and second resilient channel members rigidly attached to respective opposite sides of said housing at an inlet region of said housing; and b) said apparatus further comprises first and second adjustable channel spacers at an outlet end region of said housing, operable to resiliently deform said channel members to adjustably inwardly space said channel members from said sides at said outlet end region, to adjustably define said venturi accelerator.

* * * * *